Sept. 9, 1952      E. WILDHABER      2,609,711

AXLE DRIVE

Filed Aug. 20, 1947      5 Sheets-Sheet 1

INVENTOR
ERNEST WILDHABER
BY
ATTORNEY

Sept. 9, 1952 E. WILDHABER 2,609,711
AXLE DRIVE
Filed Aug. 20, 1947 5 Sheets-Sheet 2

INVENTOR
ERNEST WILDHABER
BY
ATTORNEY

Sept. 9, 1952     E. WILDHABER     2,609,711
AXLE DRIVE

Filed Aug. 20, 1947     5 Sheets-Sheet 3

INVENTOR
ERNEST WILDHABER
BY
ATTORNEY

Sept. 9, 1952 E. WILDHABER 2,609,711
AXLE DRIVE
Filed Aug. 20, 1947 5 Sheets-Sheet 4

INVENTOR
ERNEST WILDHABER
BY
ATTORNEY

Sept. 9, 1952 E. WILDHABER 2,609,711
AXLE DRIVE
Filed Aug. 20, 1947 5 Sheets-Sheet 5

INVENTOR
ERNEST WILDHABER
BY
ATTORNEY

Patented Sept. 9, 1952

2,609,711

UNITED STATES PATENT OFFICE 2,609,711

AXLE DRIVE

Ernest Wildhaber, Rochester, N. Y.

Application August 20, 1947, Serial No. 769,726

16 Claims. (Cl. 74—713)

The present invention relates to axle drives for automotive vehicles.

One object of the invention is to provide an axle drive, particularly a rear axle drive of the spiral bevel or hypoid type, in which, through use of a twin drive, the size of the ring gears may be reduced, as compared with conventional designs, thereby to make a more compact axle, provide increased road clearance, and permit further lowering of the body of the vehicle.

Another object of the invention is to provide a rear axle drive of the hypoid type employing two sets of hypoid gears, one for each axleshaft, and which will be able to transmit as great a load as a standard drive but which will be much more compact.

A further object of the invention is to provide an axle drive which will permit independent springing of the driven wheels.

Another object of the invention is to provide a rear axle drive which will permit independent springing of the wheels in such novel and improved fashion as to reduce materially road-shock and tire-wear.

Another object of the invention is to provide a rear axle drive having an improved form of self-locking differential incorporated therein which will prevent slippage of a wheel under adverse tractive conditions and which will enable a vehicle to pull itself out of mud or snow, or off of ice.

A still further object of the invention is to provide an axle drive with a built-in locking differential which is so constructed as to become effective whenever the turning ratio of the two driving wheels of the vehicle substantially exceeds the extreme ratio, without wheel slippage, required by the smallest turning radius of the vehicle.

Still another object of the invention is to provide a simplified form of rear axle differential employing standard bevel gears which will act only when needed and which will not interfere with normal differential action at normal driving conditions.

Other objects of the invention will be apparent hereinafter from the specification and from the recital of the appended claims.

Figure 1:
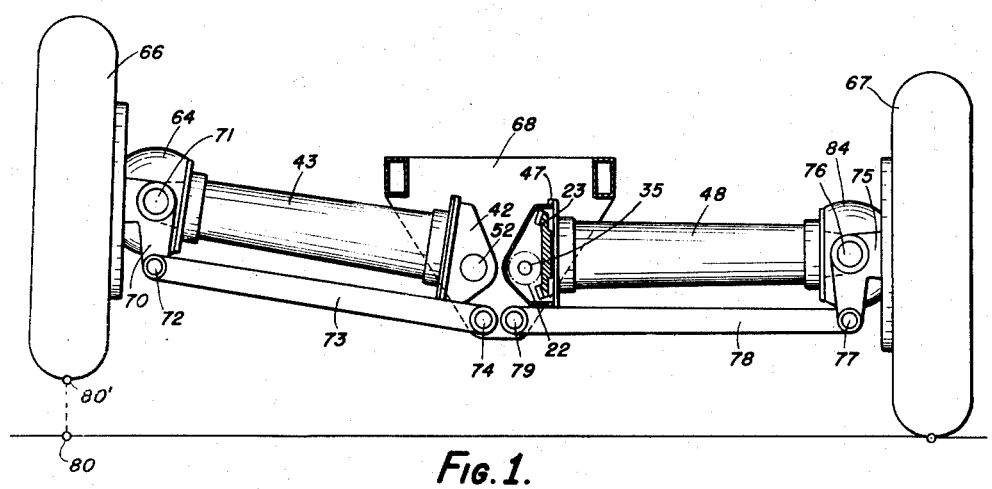
Fig. 1 is a view of an automotive axle constructed according to one embodiment of this invention and illustrating diagrammatically the independent springing possible with this modification of the invention.
Figure 2:
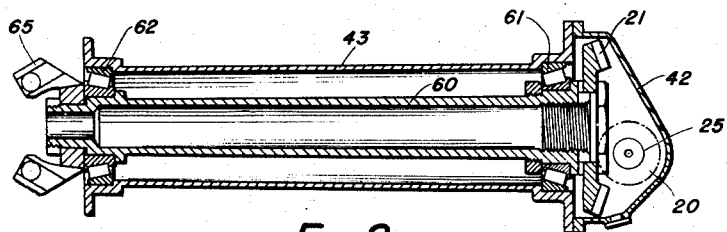
Fig. 2 is a sectional view, on an enlarged scale, of one half of the axle of Fig. 1.

Reference will be had first to Figs. 1 to 6, inclusive, which illustrate an axle drive constructed according to one embodiment of the invention in which independent springing of the driven wheels of the vehicle is permitted. Here, the two halves of the rear axle and the two wheels connected thereto are driven by two separate sets of hypoid gears, one axle shaft being driven by the hypoid pinion 20 and hypoid gear 21 (Fig. 4), and the other axle shaft 60' being driven by the hypoid pinion 22 and the hypoid gear 23. The hypoid pinion 20 is connected by a coupling 24 with a shaft 25 that is keyed to one side gear 26 of a differential whose function will be described in more detail hereinafter. The hypoid pinion 22 is connected by a coupling 34 to a shaft 35 which is keyed to a spur gear 36. This gear meshes with and is adapted to be driven by a spur pinion 37 which is keyed to the hub of the other side gear 27 of the differential. The side gears 26 and 27 mesh with and are connected by the planet pinions 28 of the differential. These are journaled on pins 29 secured in the differential housing or planet carrier 30. The planet carrier 30 is adapted to be driven in any suitable manner as through a conventional transmission (not shown), from the engine of the car, which in this case may be at the rear of the vehicle, that is, to the right of Fig. 4.

The coupling 24 rigidly connects the pinion 20 with the shaft 25. The pinion and shaft are journaled on spaced anti-friction bearings 40 and 41 in the portion 42 of one half axle of the vehicle. The pinion 22 and the shaft 35, to which it is fixedly coupled, are journaled on anti-friction bearings 45 and 46 in the portion 47 of the other half axle of the vehicle. The coupling 34, which connects pinion 22 with shaft 35, is held in tight engagement by means of a bolt 32 which threads into shaft 35 and a nut 33 which threads onto the bolt. Identical means may be used for tightening the coupling 24 which secures pinion 20 fixedly to shaft 25.

The two half axles are mounted for pivotal movement about the axes of drive shafts 25 and 35, respectively. For this purpose, there is a trunnion member 50 secured to the front side of part 42 of one half axle and the rear of this part is formed as a plain bearing 52. In similar manner member 51 is secured to the front side of part 47 of the other half axle, and the rear side of part 47 is formed as a plain bearing 53. The trunnion member 50 and plain bearing 52 are axially aligned with the shaft 25 and likewise the trunnion 51 and plain bearing 53 are axially aligned with shaft 35. The trunnions 50 and 51 are journaled in the frame member 68 of the vehicle and the plain bearings 52 and 53 are journaled in the frame part 69. Parts 42 and 47 are secured to tubes 43 and 48, respectively.

The drive connections to the two wheels are alike and only one of them need be described in detail. The axle shaft 60 (Fig. 2), for instance, to which the gear 21 is secured, is journaled on anti-friction bearings 61 and 62 in the tube 43. This axle shaft is connected by a universal joint 64 of the uniform motion type, one member of which is shown at 65, with the stub axle on which the wheel 66 of the vehicle is mounted. The other hypoid gear 23 is connected in similar manner to the other wheel 67 of the vehicle.

From the preceding description, it will be seen that as the vehicle moves along its wheels 66 and 67 are driven by the two hypoid gear pairs 20—21 and 22—23, respectively, and are also able to pivot about the axes of the hypoid drive pinions when they contact bumps or depressions in the road. One of the features of the present invention is that when a wheel hits a bump or depression in the road, it will move backwardly as well as upwardly, that is, it will tend to roll over the obstacle instead of merely sliding thereover.

This makes for smoother riding. This effect is achieved by the use of the two drive pinions 20 and 22 and by pivotally mounting the axles, as described, for swinging movement about the axes of these pinions.

Since the rotation of both pinion shafts is backed up by the fly wheel of the engine of the vehicle, the rotation of the pinion is but slightly affected by pivotal movement of its half axle about its axis. Let it be assumed for the purpose of explanation that the rotation of the pinion is unaffected by pivotal movement of the half axle. Ordinarily, the gear 21 or 23 driven by the pinion turns at a uniform rate. When the wheel pivots upwardly, however, the gear receives an additional turning motion as though it were rolling on a stationary pinion. This additional motion can be considered as composed of an upward rocking motion of the gear and pinion through an angle $a$ about the axis of the pinion as a unit, and of a forward turning motion of the pinion back to its starting position through this same angle $a$. The gear then turns forward through an angle $$a \cdot \frac{n}{N}$$

where $n/N$ denotes the ratio of the tooth numbers of pinion and gear. As the half axle swings through an angle $a$, point 80 of normal contact of the wheel surface with the road moves upwardly in the direction 81 and also about the wheel axis through the angle $$a \cdot \frac{n}{N}$$

If $R$ denotes the wheel radius, the lateral displacement will amount to $$a \cdot R \cdot \frac{n}{N}$$

Figure 3:
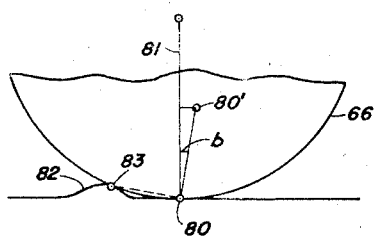
Fig. 3 is a diagram illustrating the results achieved with the novel independent springing construction of this invention.

The resultant path 80—80' is seen to be inclined moderately to the vertical by an angle such as denoted at $b$ in Fig. 3. The same is true for the opposite road wheel. This motion is obtained by disposing both drive pinions 20 and 22 in front of the driven gears 21 and 23 even when the engine is at the rear of the axle, and by pivoting the axle halves about the axes of the two drive pinions.

The advantage of this motion may be seen from Fig. 3. When the wheel 66 strikes an obstacle 82, it is best that it strike with rolling motion instead of with relative sliding motion at the point of contact 83. Rolling motion at point 83 means that the relative motion is a turning motion about an instantaneous axis 83. This is possible only if point 80 is constrained to move at right angles to radius 83—80, that is, in a direction inclined to the vertical. This is true in the instance illustrated. In general, the resultant motion depends upon the height of the obstacle. Rolling motion is more nearly achieved with my mounting than with known constructions where the only motion of the wheel is a vertical motion, especially where the amount of motion is substantial. The axle drive of the present invention, therefore, distinctly improves car performance on rough and wavy roads.

To achieve the desired pivotal motion and yet insure sufficient rigidity, the wheels are preferably connected with the vehicle frame by linkages which will now be described. Road wheel 66 is connected, for instance, to the frame part 68 of the vehicle by a bell-crank member 70, link 73 and pin 74. The stub axle of wheel 66 is mounted on bell-crank 70. This bell-crank is pivotally mounted on a part connected with tube 43 by means of a pin 71 which is co-axial with one of the axes of the universal joint 64. The bell-crank member is connected by a pin 72 with the link 73. The link is pivotally connected by the pin 74 with the vehicle frame to swing about an axis parallel to the axis of drive shaft 25. In similar manner, the stub axis of the wheel 67 is mounted on one end of a bell-crank member 75, which is pivotally mounted on the other tube 43 by means of a pin 76, that is coaxial of one of the axes of the universal joint. The bell-crank member 75 is, in turn, connected by means of a pin 77 with a link 78 that is pivotally mounted by means of pin 79 on the vehicle frame.

The springs by means of which the chassis is mounted upon the half axles are not shown in the diagrammatic view of Fig. 1. Any suitable arrangement may be used.

The wheel brakes are not shown either for they form no part of the present invention. They may be of any known or suitable type.

The modification of the invention described offers not only the advantage of smoother riding but also the additional feature of a self-locking differential to prevent slippage of a wheel on ice or in snow or in the mud. In the differential unit 30, the side gears 26 and 27 have different tooth numbers and are of unequal size. This means that different amounts of torque will be transmitted to the two side gears 26 and 27, the torques transmitted being proportional to their tooth numbers. To obtain equal torque on the two wheels 66 and 67, then, it is necessary to provide different gear reductions between the side gears and the respective wheels. Accordingly, the ratio of the gears 37 and 36 is selected to be equal to the ratio of the tooth numbers of the side gears 27 and 26. In this way, the same torque is transmitted to the two drive pinions 20 and 22. With this construction, then, when the vehicle runs in a straight path and the two drive pinions 20 and 22 turn at the same speed, the planet pinions 28 turn on their axes and the two side gears 26 and 27 move relatively to one another. The smaller side gear 27 turns faster than the planet carrier 30 and the larger side gear 26 turns slower than the planet carrier. The ratio of the tooth numbers of the two side gears 26 and 27 is slightly in excess of the extreme turning ratio of the two opposite wheels 66 and 67 at the smallest turning radius of the vehicle. Thus, the ratio of the tooth numbers of the side gears 26 and 27 may be 7 to 5, for example.

Differentials of this general character, where the planet pinions turn continuously on their axes during the ordinary straight run of the vehicle, may be called working differentials. This term will distinguish them from the conventional differential where no turning motion of the planet pinions occurs while the vehicle is moving in a straight path. The purpose of a working differential here is to obtain a simple differential lock.

During forward motion of the vehicle the two drive pinions 20 and 22 turn in the direction of the arrows 85 and 86, respectively. They turn at the same rate as long as the vehicle moves in a straight path. Side gear 27 then turns at a slightly faster rate. When the vehicle makes a right hand turn, the wheel to the left has to turn faster than the wheel to the right. This means then that, as with any standard differential, the side gear 27 operatively connected with the left hand wheel must also turn faster. When the vehicle makes a left hand turn, the wheel at the left must slow down. Likewise, the side gear 27 connected to that wheel must slow down. Even with the sharpest possible turn, obtained at the largest possible angle of the front wheels, the side gear 27 moves a trifle faster than the planet carrier 30. Only, when the wheel at the right, the one at the curb side, slips and tends to spin, does the wheel at the left slow down still further, so that the side gear 27 tends to move more slowly than the planet carrier. To avoid slippage of the right wheel I have provided a mechanism which comes into operation as soon as the gear 27 tends to reverse its relative motion with respect to the planet carrier. This is in the form of a one-way clutch which is embodied in the axle drive. This clutch takes hold and locks the side gear 27 to the planet carrier 30 at the instant that gear 27 tends to reverse its relative motion with respect to the planet carrier.

Figure 6:
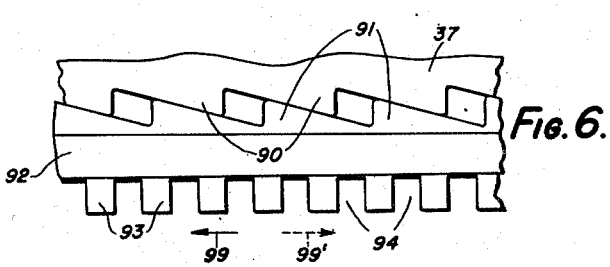
Fig. 6 is a fragmentary developed view on an enlarged scale of parts of the over-running clutch of Fig. 4.
Figure 7:
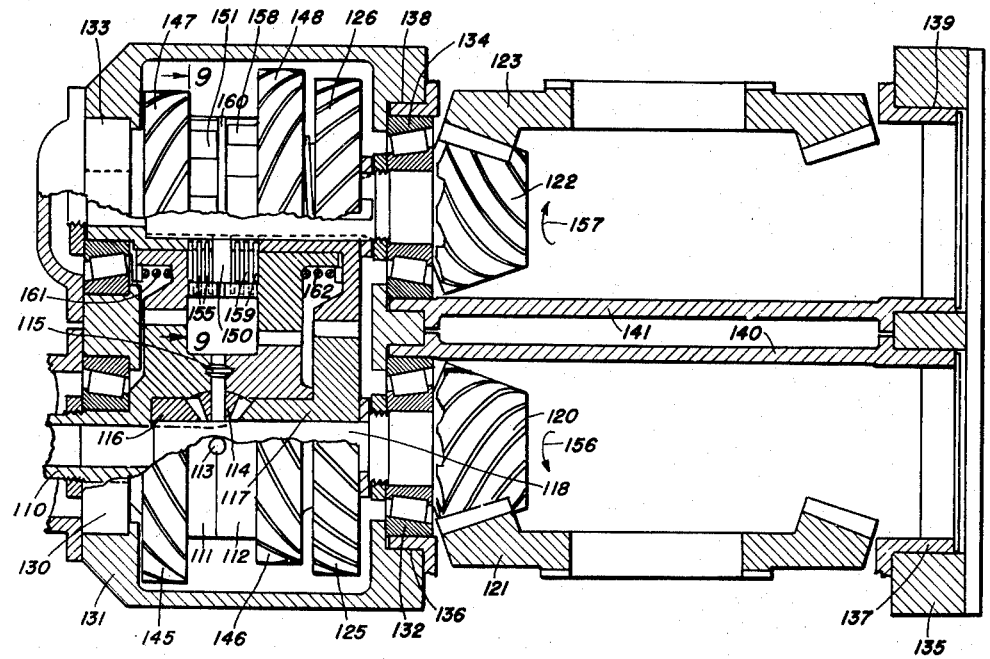
Fig. 7 is a part plan, part sectional view showing a rear axle drive constructed according to another modification of the invention and embodying a self-locking differential of modified form and particularly adapted for use where the engine is mounted at the front of the vehicle.

The one-way or over-running clutch is of the axially engaging type. The gear 37 has a face clutch member formed on its rear face comprising the saw teeth 90 (Fig. 6). The inclined sides of these teeth are helical surfaces. These teeth engage the mating teeth 91 of a saw tooth face clutch member formed on one end of a disk 92. This disk has a hub portion 93 at its opposite side that is provided with equi-spaced slots 94. The planet carrier 30 is provided with a forwardly projecting cylindrical hub portion 95 (Fig. 4) which is disposed radially outwardly of hub 93 and is provided with equi-spaced slots 96. Plain friction disks 97 and 98 of conventional design fit alternately into the slots 94 and 96, the disks 97 having internal teeth engaging in the slots 94 and the disks 98 having peripheral teeth engaging in the slots 96. When the car is moving ahead or the wheels are turning in normal fashion, the slight friction of the disks is in the direction of the arrow 99 (Fig. 6), that is, the friction tends to hold back and retard the disk member 92. The mating saw tooth clutch members then tend to further approach each other so that the pressure between the disks is further reduced. As soon as the relative motion tends to reverse, however, the friction of the disks also reverses and is in the direction of the arrow 99'. It then tends to separate the two saw tooth clutch members. This increases the disk pressure until sufficient pressure is built up to lock gear 37 and side gear 27 frictionally to the planet carrier 30.

The slope of the helical sides of the teeth 90 and 91 of the face clutch members may be increased with increasing number of frictional contacts. There are two contacts per friction disk. With an ample number of contacts a large slope may be used as shown. This prevents jamming and sticking. With a large slope there is no difficulty with disengagement which is smooth whenever normal road conditions have returned.

As long as the right hand wheel slips, then, the differential will turn as a solid unit and compel the two road wheels 66 and 67 to turn at the ratio of the gears 37 and 36. Thus the drive wheel at the right is prevented from spinning. All it can do is to run slightly faster than the left hand drive wheel. Torque is transmitted to the latter regardless of whether or not the wheel on the curb side slips.

Because disk member 92 tends to rotate in the direction of arrow 99' during reversal of the vehicle, some means must be provided for disengaging the one-way clutch during reversal. This will now be described.

Disk member 92 has a conical outside surface 100. This conical surface is adapted to be engaged by a left hand helical surface 101 formed on a trip member 102. Trip member 102 is rotatably mounted on an extension 103 of shaft 35 and may turn on this shaft between two stops, one of which is shown at 104 secured in the frame of the vehicle. The stop member 104 is so placed that trip member 102 is just out of contact with disk member 92 when the clutch is engaged during forward motion of the vehicle. When reversal occurs, however, the trip member 102 turns in a direction opposite to arrow 86 to its other position. It then prevents engagement of the clutch by interfering with disk 92 so that the disk 92 cannot move axially to the right a sufficient distance to engage the one-way clutch.

Figure 4:
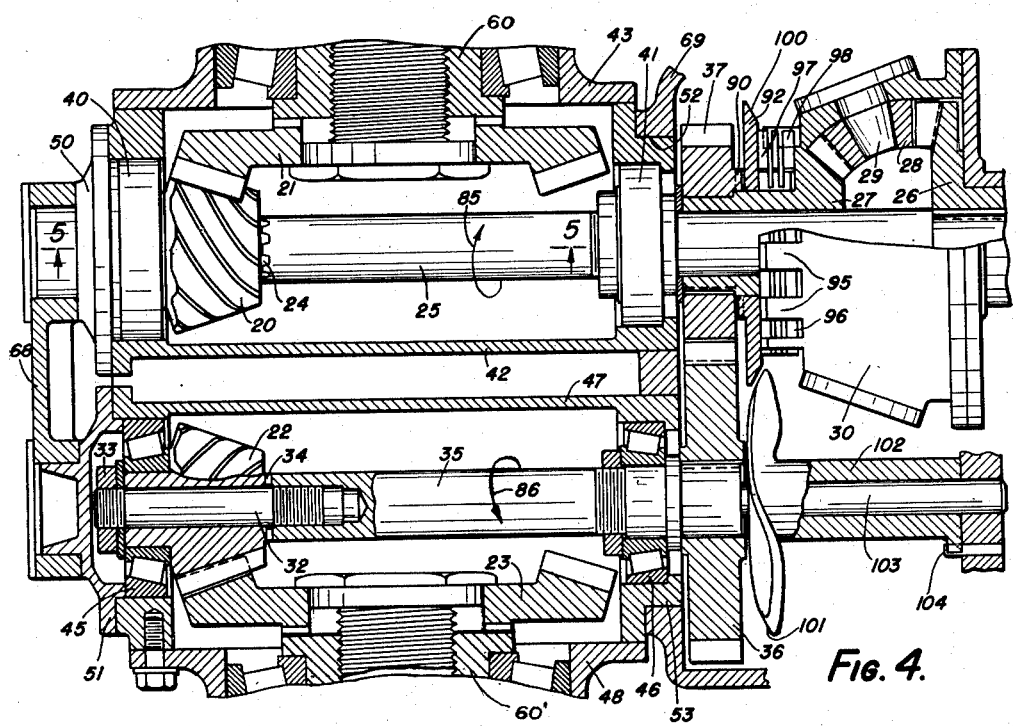
Fig. 4 is a part plan, part horizontal sectional view illustrating further details of the axle drive particularly in an embodiment where the engine is mounted at the rear of the vehicle.
Figure 5:
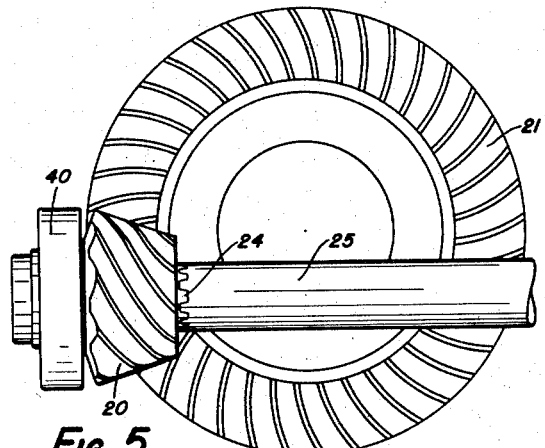
Fig. 5 is a fragmentary sectional view on the line 5—5 of Fig. 4.

The embodiment of the invention shown in Figs. 4 and 5 only prevents the wheel on the curb side from spinning. Ice conditions are usually worse on the curb side of the road, however, than near the middle. The chief difficulties are therefore obviated with the described embodiment of the invention, and the cost is reduced as compared with a mechanism which will lock both wheels. In other embodiments of the invention, however, means are provided for preventing spinning of either wheel. In all cases the desired normal differential action is fully retained under all normal conditions and the differential is locked only when needed to prevent spinning. Obviously, the self-locking differential can be omitted entirely if desired.

In the embodiment of the invention shown, it will be seen that the drive pinions 20 and 22 are both at the same side of the axis of the axle; that they are in front of their ring gears; that they are of opposite hand; and that the ring gears 21 and 22 face each other.

A further embodiment of the invention will now be described with reference to Figs. 7 to 10, inclusive. Here the drive is from the front of the vehicle. In other words, this embodiment is constructed for a vehicle having its engine in front. A modified form of differential locking mechanism is also provided in this embodiment of the invention.

Power is transmitted from the engine to the rear axle through a shaft 110 which forms part of a two-part planet carrier, one part of which is designated 111 and the other part of which is denoted at 112. The two parts are bolted together and contain semi-circular recesses for the pins 113 on which the planet pinions 114 are journaled. The pins are held axially against movement through circular projections 115 which fit into circular grooves provided on the two parts. The planet pinions 114 mesh in this embodiment of the invention with side gears 116 and 117 which have equal numbers of teeth. The side gear 116 is keyed to the shaft 118 of a hypoid pinion 120. This pinion meshes with a hypoid gear 121 to drive one half of the axle of the vehicle. The other half axle is driven by a hypoid pinion 122 and a hypoid gear 123. The side gear 117 is formed integral with a helical gear 125 that meshes with a helical gear 126. The latter is rigidly secured to the shank of hypoid 122. Pinion 122 is mounted on an axis parallel to the axis of pinion 120.

The shank 118 of pinion 120 is journaled in the hollow shaft 110 and on an anti-friction bearing 132 in a housing 131 that is secured to the frame of the vehicle. The shaft 110 itself is journaled on an anti-friction bearing 130 in this housing. The shank of the pinion 122 is journaled on spaced anti-friction bearings 133 and 134 in this housing.

Figure 8:
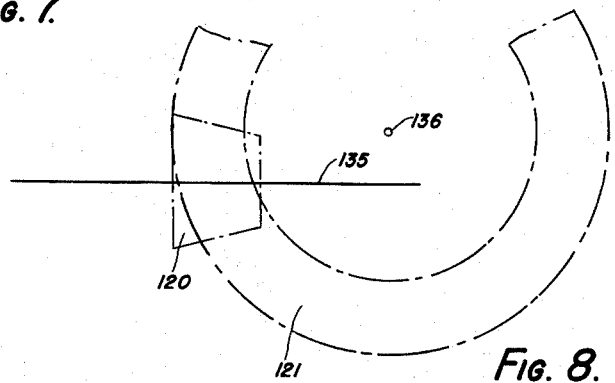
Fig. 8 is a diagrammatic view showing one of the hypoid gear pairs of Fig. 7.
Figure 9:
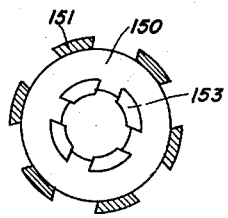
Fig. 9 is a section on the line 9—9 of Fig. 7.
Figure 10:
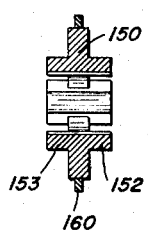
Fig. 10 is an axial sectional view further illustrating details of the friction clutch of the drive of Fig. 7.
Figure 11:
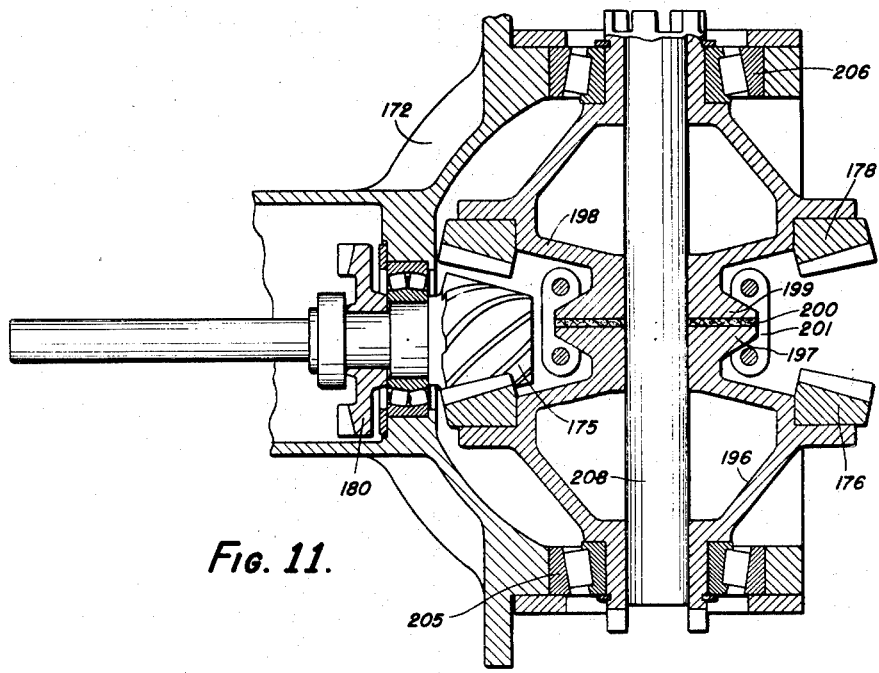
Fig. 11 is a part plan, part sectional view of an axle drive constructed according to a still further embodiment of the invention.
Figure 12:
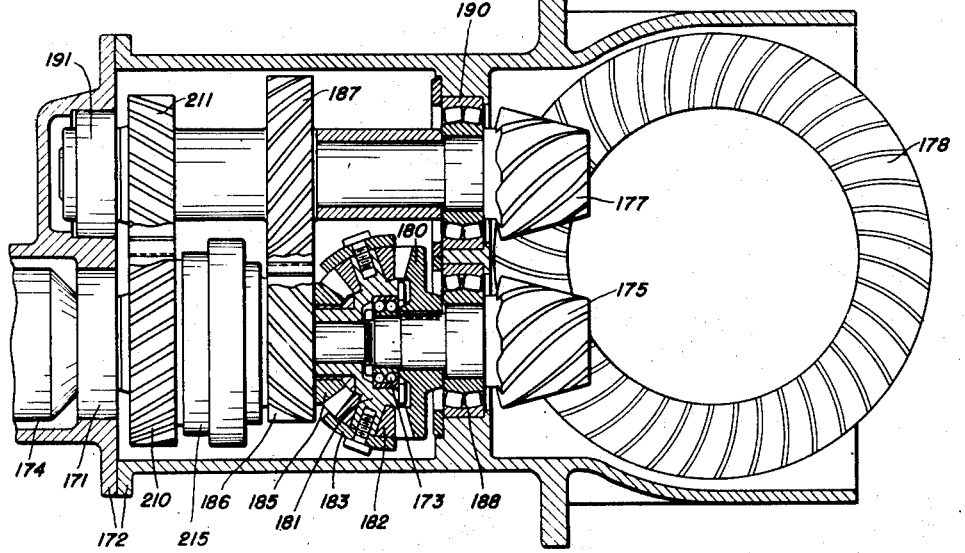
Fig. 12 is a sectional view taken at right angles to Fig. 11 and showing further details of this drive.

Fig. 8 illustrates diagrammatically the relative positions of the axes 135 and 136 of the hypoid pinion 120 and of hypoid gear 121 which are here indicated by their pitch surfaces only. This figure might likewise illustrate the relative positions of the axes of the hypoid pinion 122 and its mate gear 123. The two pinions 120 and 122 are mounted side by side with their axes in the same horizontal plane and the two gears 121 and 123 are normally coaxial. Again the pinions are of opposite hand, and the two gears, which are also of opposite hand, face one another.

For independent springing, the hypoid gears 121 and 123 and the axle shafts, which are attached thereto, are mounted to pivot about the axes of their respective drive pinions 120 and 122 with respect to the frame of the vehicle. Housing 131 and plate 135 are rigidly secured to the frame of the vehicle. They are formed with journals at 136 and 137 and at 138 and 139 for the two half axles 140 and 141. These are shown only partially and may be constructed as described with reference to Figs. 1, 2, and 4.

The differential lock of this embodiment of the invention contains two helical gears 145 and 146 which are formed integral with the two parts 111 and 112 of the planet carrier, respectively. Gear 145 may further be formed integral with shafts 110 while gear 146 is journaled on the hub of helical gear 125. The gear 145 meshes with a helical gear 147 and the gear 146 meshes with a helical gear 148. The two helical gears 147 and 148 are rotatably mounted on the shank of pinion 122 or on a part rigidly secured to it.

It should be noted that the ratio of the tooth numbers of the gears 145 and 147 is slightly larger than the ratio of the tooth numbers of the gears 125 and 126 through which power is transmitted to pinion 122, that is, is here slightly larger than 1 to 1. The tooth ratio of the other pair of gears 146 and 148 is slightly smaller than the ratio of the tooth numbers of the gears 125 and 126. Thus, the ratio of the gear pair 145, 147 may be for instance 6:5 and the ratio of the gear pair 146, 148 may be 5:6.

When the vehicle is running straight normally, the two hypoid pinions 120 and 122 turn at the same rate, but the gear 147 turns faster than pinion 122 while the gear 148 turns at a slower rate. When the wheel driven by pinion 122 loses traction, however, this pinion will speed up and quickly reach the speed of gear 147. Reversal of relative motion between gear 147 and pinion 122 is again prevented, however, by an over-running or one-way clutch. This clutch locks the pinion 122 and gear 147 together and prevents spinning of this one wheel. In this embodiment of the invention, the other wheel is lockable, also against spinning. When the other wheel, which is driven through pinion 120, loses traction, pinion 120 speeds up and pinion 122 slows down to the speed of gear 148. Slowing down further would mean reversing the relative motion of gear 148 and pinion 122. This is prevented through the gear pair 146, 148 and a second over-running clutch.

The over-running clutches are of the axially engaging type. The gears 147 and 148 themselves are axially movable a slight amount.

Rigidy secured to the shank of pinion 122 is a disk 150. This disk has hub portions 152 and 153 (Fig. 10) at opposite sides, each of which is provided with equi-spaced slots. The gear 147 has a slotted hub-portion 151 projecting from one side. Between the disk 150 and the gear 147 are interposed a plurality of friction disks 155. Alternate disks are connected to gear 147 and hub portion 153 of member 150, respectively, by interengagment with the slots of gear 147 and hub 153, respectively. Movement to the right of gear 147 will squeeze the friction disks 155 between the gear 147 and member 150. Axial pressure is obtained by providing teeth on gear 147 which are of large helix angle. Ordinarily, during forward motion, the gear 145 drives the gear 147. It does so with a very light load, just enough to overcome the friction as the gear 147 moves faster than pinion 122. The very light axial pressure resulting from this frictional torque then tends to move gear 147 to the left. Arrows 156 and 157 indicate the directions of rotation of the pinions 120 and 122 during forward motion of the vehicle. The hand of the teeth of gear 147 is so selected that this gear tends to move to the right toward member 150 when this gear drives gear 145 during forward motion of the vehicle. At the beginning of reversal of relative motion, that is when slippage occurs, the friction reverses, and the thrust is then to the right. This then puts the friction disks 155 into closer engagement and into pressure so that the frictional torque increases. This again increases the tooth load and the frictional torque. Locking occurs provided that the number of frictional contacts, that is, the number of friction disks is large enough for the helix angle provided on the teeth. This stops slipping of one drive wheel then, during forward motion.

Interposed between gear 148 and the right hand side of member 150 are a plurality of friction disks 159. Alternate disks are connected with the hub 152 of member 150 and with gear 148, respectively, by the slots in hub 152 and the slots in hub 153 of the gear, respectively.

Ordinarily, gear 148 drives gear 146 with a very light frictional torque, because the gear 148 moves ordinarily slower than pinion 122 and receives forward frictional torque from it. The left hand gear 148 shown therefore ordinarily receives a light thrust reaction to the right. Any thrust reaction to the right of gear 148 tends to disengage the friction disks 159. At the start of reversal, however, when the wheel, to which gear 121 is connected, slips, the friction is reversed and the gear 146 then drives the gear 148. The gear 148 is then pressed to the left toward member 150. The friction thereby created on the friction disks 159 locks the gear 148 to the pinion 122 as desired. Spinning of the other drive wheel during forward motion is thus prevented.

If no other means were provided locking would also occur during ordinary reverse motion. Moreover, it would occur on both gears simultaneously. This is prevented in the embodiment shown by arranging so that the axially locking displacements occur in opposed directions. Gear 147 locks when moving to the right; gear 148 locks when moving to the left, and the two gears get in the way of one another when they move together to lock simultaneously. Hence, neither of them locks during reversal. On reversal, the gears press from opposite sides against a ring 160, which is mounted on member 150 and is sufficiently wide to engage the hubs of both gears and prevent locking of either.

Light short springs 161 and 162 press the gears 147 and 148 gently toward each other. A balance is kept on or near the central position with both gears unlocked. This balance is overcome only when one gear tends to lock so that the thrust created by the frictional torque of the disks is not opposed.

The differential lock for preventing either road wheel from spinning is seen to comprise in this embodiment of the invention two over-running clutches, which engage axially in directly opposite directions, and means for preventing clutch engagement during the reverse motion of the vehicle by letting the two clutches oppose each other when they both tend to engage simultaneously. It is to be understood that this type of differential lock may be used with the first described embodiment of the invention and vice-versa, the type of differential lock described in connection with the first embodiment of the invention may be used in connection with the embodiment just described. The various forms of differential locking mechanisms may be used interchangeably in any of the rear axle drives of this invention.

A further embodiment of the invention will now be described with reference to Figs. 11 to 18, inclusive. In these figures, are shown an application of the invention to the more conventional type of wheel springing, where the two driven wheels of the vehicle have interdependent springing rather than independent springing. In this case, the driven gears are mounted in the same carrier and remain coaxial at all times.

In the embodiment of the invention illustrated, the two axle shafts are driven by two hypoid pinions 175 and 177. The pinion 175 meshes with and drives a gear 176. The pinion 177 meshes with and drives a gear 178. The two hypoid pinions 175 and 177 again have their axes parallel, and again mesh with opposed gears, but in this case one drive pinion 177 is mounted above the other drive pinion 175. The pinion 175 is mounted below the axis of its mating gear 176 while pinion 177 is mounted above the axis of its mating gear 178. With this arrangement pinions of the same hand of sprial may be used, preferably left hand pinions as shown. In fact, the pinions 175 and 177 may be identical except for their shank portions. The gears 176 and 178 may be identical also. The pinion axes are slightly displaced laterally from one another just the amount required to keep the pinion 175 clear of gear 178 and to keep pinion 177 clear of gear 176. This places the drive shaft very nearly in the center between the two driven wheels.

Figure 13:
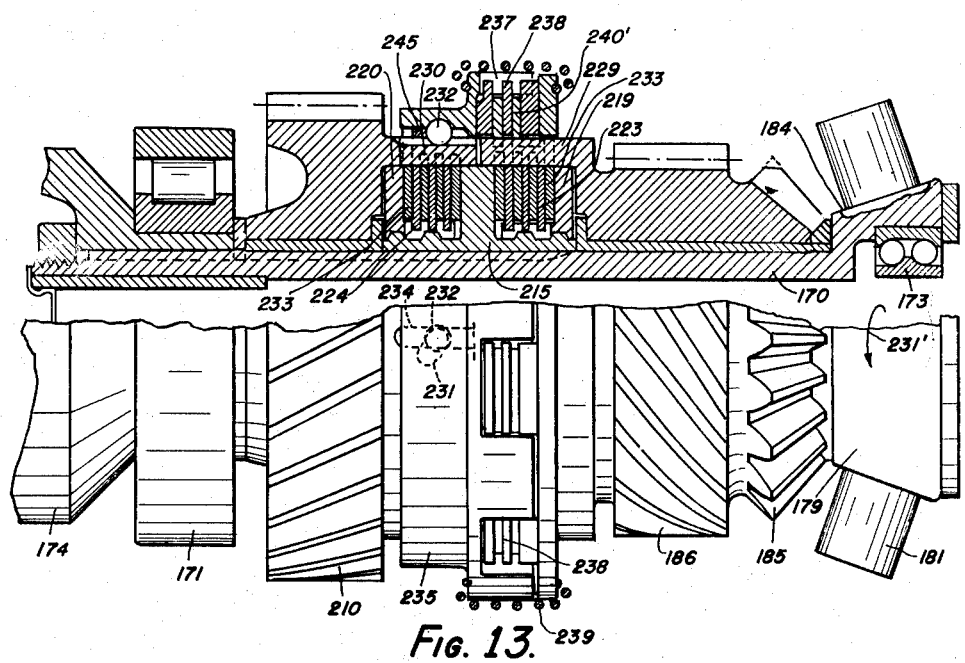
Fig. 13 is a part elevational, part sectional view on an enlarged scale showing the planet carrier of Figs. 11 and 12 and the gears associated therewith.
Figure 14:
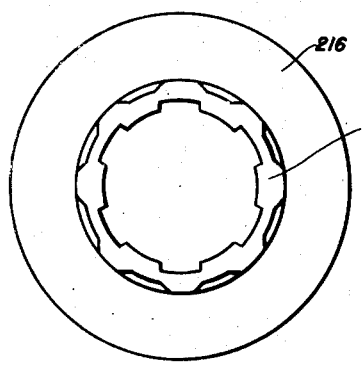
Figs. 14 and 15 are an end view and a side elevation, respectively, of the threaded member which operates two of the clutches of Fig. 13.
Figure 15:
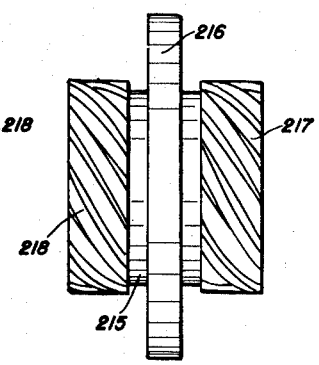

Power is applied from the left through a hollow shaft 170 which is formed at its right end as part of a planet carrier 179 (Fig. 13). This shaft is mounted by means of sleeve 174 on an anti-friction bearing 171 in housing 172 and on an anti-friction bearing 173 on the shank of the drive pinion 175. The pinion 175 is driven from the planet carrier 179 through one side gear 180 of the differential, this gear being keyed to the shank of the pinion.

In this embodiment of the invention a working differential is employed. The planet carrier 179 contains outwardly projecting pins 181 on which are journaled the planet pinions 182. The pinions are held against outward radial movement by a ring 183 which is secured to the pins. Its spherical inside surface engages the spherical outside surface of the pinions. The pinions are held against inward radial movement by bearing against the plane sides 184 of the planet carrier. The pins are inclined to a plane through the common apex of the gears and perpendicular to the axis of the differential. As a result the two side gears 180 and 185 of the differential have different diameters and different numbers of teeth. The larger side gear 180 is keyed to drive pinion 175. The smaller side gear 185 is formed integral with a helical gear 186 and is rotatably mounted on hollow shaft 170. The gear 186 meshes with a helical gear 187 that is rigidly secured to the shank of drive pinion 177. The ratio of the tooth numbers of gears 186 and 187 is the same as the ratio of the tooth numbers of the side gears 185 and 180.

In operation, the pinions 182 turn slowly on their pins 183 when the two hypoid pinions 175 and 177 turn at the same speed. In this way equal torque may be transmitted to the pinions 175 and 177 even though unequal torques are transmitted to the side gears 180 and 185. Pinion 175 is mounted in an anti-frictional bearing 188 disposed in back of the pinion itself. The end of its shank is journaled in a plain bearing in the hollow shaft 170. Bearing 188 is of known radial type which can take axial thrust load in both directions. In view of the moderate thrust loads a bearing is shown whose outer race contains a hollow spherical working surface. Other types of bearings, however, may also be used. Pinion 177 is rotatably mounted in anti-friction bearings 190 and 191 in housing 172. Bearing 190 is adapted to take axial thrust loads in both directions.

Moderate thrust loads are attained on the pinion shanks by making the hand of the driving gear 186 opposite to the hand of the teeth of the pinion 175, which also results in a hand of the driven gear 187 the same as the hand of its coaxial pinion 177. Gear 187 and pinion 177 are both left hand. Gear 186 is right hand while pinion 175 is left hand. The results in opposite thrust reactions on driving gear 186 and pinion 175 and also on driven gear 187 and pinion 177.

The two ring gears 176 and 178 are rigidly secured to hub members 196 and 198, respectively, which at adjoining ends are provided with circular portions 197 and 199. These two circular portions contain confronting plane faces which are perpendicular to the axes of the gear, but on their other sides the two circular portions have conical surfaces coaxial with the gears. The plane sides of the two members bear against a bronze ring 200 on opposite sides so that thrust loads tending to press the gears toward each other are directly taken up. The conical sides of the hub members are engaged by a slip ring 201, whose two halves are bolted together. This ring contains inside conical surfaces which match the conical surfaces of the hub members and permit relative sliding. Through this engagement thrust loads are directly taken up which tend to separate the two ring gears axially.

The two hub members 196 and 198 are therefore rotatably mounted with reference to each other. They are further journaled in an extension of housing 172 on anti-friction bearings 205 and 206. This housing has a flange 207 which may be bolted to the axle proper. A tubular central member 208 further serves to rotatably connect the two hub members to each other. Tubular member 208 extends inside from one end anti-friction bearing 205 to the other end anti-friction bearing 206 and, if desired, may be fastened to one of the hub members.

The differential lock in this embodiment of the invention comprises an over-running clutch, which prevents gear 186 from reversing its direction of rotation relative to shaft 170 of the planet carrier; a pair of cylindrical gears 210 and 211; and a second over-running clutch which prevents gear 210 from reversing its direction of rotation relative to the shaft 170 of the planet carrier. The gear 211 is rigidly secured to the shank of hypoid pinion 177. Gear 210 is rotatably mounted on shaft 170 in axially fixed position. The ratio of the tooth numbers of the gears 210 and 211 is larger than 1:1 and may be, for instance, 6:5. The two over-running clutches are of the axially engaging type with opposite directions of engagement and mounted coaxially. There is means provided, also, for preventing clutch engagement during reverse motion of the vehicle.

Figure 18:
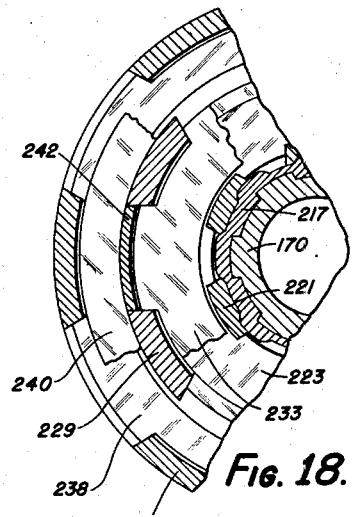
Fig. 18 is a fragmentary sectional view on an enlarged scale and with parts broken away, showing details of one of the clutches of this drive.
Figure 16:
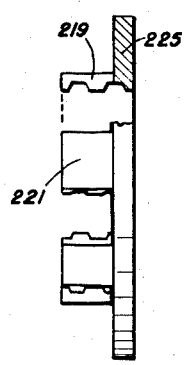
Fig. 16 is a part elevational, part sectional view of one of the nuts which cooperates with this member.
Figure 17:
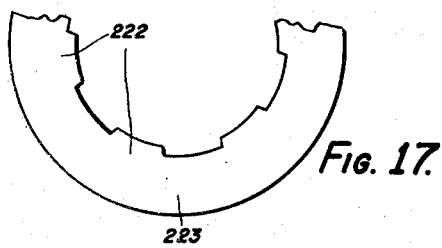
Fig. 17 is a partial end elevation of one of the friction disks which is adapted to be mounted upon this nut.

Between the gears 186 and 210 and keyed to the shaft 170 there is mounted a member 215. This member has a disk portion 216 (Fig. 15) and at either side thereof two threaded portions 217 and 218 which have multiple threads of the same hand. The threads are of right hand in the example shown. The threads engage nut members 219 and 220, respectively. These nut members have circular flanges on them. Flange 225 of nut member 219 is formed at its right end whereas the flange of nut member 220 is formed at its left end. Nut member 219 is shown in Fig. 16. Its hub 221 is slotted for engagement with teeth 222 formed internally on friction disks 223 (Figs. 17 and 18). In similar manner, the hub of nut 220 is slotted to engage friction disks 224.

The gears 186 and 210 contain laterally projecting hubs 229 and 230, respectively, which are slotted to hold other rotatably fixed but axially movable friction disks 233 that are toothed on their peripheries (Fig. 18).

The clutch comprises the friction disks disposed between the ring part 216 of threaded member 215 and the flange portion of nut member 219 or nut member 220. Alternate disks are rotatably held by the nut member and by the hubs 229 and 230, respectively.

Let arrow 231' denote the direction of rotation of the differential during forward motion of the vehicle. The gear 186 ordinarily turns faster than the shaft 170 of the planet carrier and the gear 210 ordinarily turns slower. Reversal of the relative rotation of gear 186 means relative motion with respect to member 215 in a direction opposite to the arrow 231'. The resulting friction then tends to turn nut member 219 on the threads of member 217 so as to move the nut member towards the projection 216. Frictional locking then occurs through operation of the disks 223 and reversal of the relative motion is prevented as desired.

In similar manner the nut member 220 is moved toward projection 216 on reversal of relative motion of gear 210 on shaft 170. This also causes frictional locking and prevents wheel spinning. Hence, in this embodiment of the invention, also, spinning of both drive wheels of the vehicle is prevented.

When the wheel no longer spins, the corresponding clutch disengages readily. On account of the substantial lead angle of the threads no jamming occurs.

The means for preventing clutch engagement during reverse motion of the vehicle will now be described. The end disks 233 (Fig. 13), that is, the two disks 233 at the extreme right and extreme left, respectively, are made larger in diameter than the other disks 233. The teeth of these end disks will therefore be radially longer than the teeth of the other like disks.

Mounted on the hub 230 of gear 210 is a ring member 235. Ring member 235 has short helical grooves 231 formed on its inside surface for engagement with balls 232. Each ball 232 is also movable in a straight axial slot 234 formed on the outside of the hub 230 of gear 210. Ring member 235 is therefore free to move axially. It contains a slotted lateral annular projection 237 (Figs. 13 and 18) into which fit alternate friction disks 238. Other alternate friction disks 240 are rotatably held by the slotted hub 229 of gear 186. One of these disks 240' has a hub portion 242 thereon which projects to the right and is adapted to engage the rightmost disk 233 on reversal of the vehicle. The disks 238 and 240 are lightly pressed together by a light garter shaped coiled spring 239.

The two gears 186 and 210 move in one direction relative to each other during forward motion of the vehicle and in the opposite direction during reverse motion. During reverse motion, gear 186 moves in a direction opposite to arrow 231' relative to gear 210. The friction of the disks 223 and 233 therefore tends to move ring member 235 clockwise as viewed from the right so that the balls 232 move to the left end of the helical grooves 231. This increases the distance between the balls 232 and the disk 240'. The projection 242 on the latter may engage end disk 233 of the clutch at the right. This prevents this right hand clutch from functioning. At the same time, the balls 232 are in engagement with a ring 245 which abuts against the end disk 233 of the clutch to the left, so that it, too, is held out of frictional engagement with the next disk 223 to the right, and the left hand clutch is prevented from functioning also. Thus, during reversal no locking of the differential takes place.

Ring member 235 and disks 238 can also be considered as an over-running clutch which expands axially and prevents locking when the motion of the vehicle is reversed. This clutch acts faster than the other two clutches since its diameter is larger and the lead of the helical path is correspondingly larger. Also the relative motion of the gears 186 and 210 is faster than the relative motion between the planet carrier and either of the two gears.

It will, therefore, be seen that I have provided with this last described embodiment of the invention an axle drive which is compact and will occupy a minimum of space, as is the case with the other embodiments described, and that it comprises, moreover, a locking type differential which will prevent spinning of either drive wheel on motion in the forward direction.

While the invention has been illustrated and described in connection with the use of longitudinally curved tooth tapered hypoid gears for driving the axles, it will be understood that it is applicable, also, where tapered hypoid gears in which one of both members have skew teeth are used for driving; and that, moreover, hypoid drive gears may be used where the drive pinion is cylindrical and the driven gear is a flat face gear; and that the term tapered as used in the specification and claims is intended to cover such gears. It will be understood, also, that the drive gears may also be spiral bevels, skew bevels or even straight bevels.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. An axle drive for an automotive vehicle comprising a pair of drive pinions mounted for rotation on adjacent parallel axes, a driven gear meshing with each pinion with its axis angularly disposed to the axis of the pinion, an axle shaft secured to each driven gear and operatively connected to one of two opposite wheels of the vehicle, and means for driving the two pinions simultaneously in opposite directions, said driven gears facing one another and having longitudinally inclined teeth which are of the same hand, and the two pinions having longitudinally inclined teeth which are of the same hand but of opposite hand to the teeth of the gears and being mounted one above the other at the same side of the axes of the gears.

2. An axle drive for an automotive vehicle comprising a pair of tapered drive pinions mounted one above the other for rotation on parallel axes, a differential mounted coaxial with one of said pinions, one element of which is rigidly connected to said one pinion, a pair of cylindrical gears for connecting another element of the differential with the other pinion, said cylindrical gears being coaxial, respectively, with the two pinions, and one of said cylindrical gears being rigidly connected with its coaxial pinion, a pair of tapered driven gears meshing, respectively, with said pinions with their axes singularly disposed to the axes of the pinions, and a pair of axle shafts, each of which is secured to one of said driven gears and is operatively connected to one of two opposite wheels of the vehicle, said driven gears facing one another.

3. An axle drive for an automotive vehicle comprising a pair of tapered drive pinions mounted for rotation on parallel axes which lie in the same plane, a differential mounted coaxial with one of said pinions, one element of said differential being connected to said coaxial pinion, a pair of cylindrical gears for connecting another element of the differential with the other pinion, a pair of tapered driven gears meshing, respectively, with said pinions, and a pair of axle shafts, each of which is secured to one of said driven gears and is operatively connected to one of two opposite wheels of the vehicle, said driven gears facing one another and having teeth of opposite hand, and said pinions having teeth of opposite hand and being disposed at the same side of the axes of the driven gears.

4. An axle drive for an automotive vehicle comprising a pair of drive pinions mounted for rotation on parallel axes, a differential mounted coaxial with one of said pinions, one element of said differential being connected to said coaxial pinion, a pair of gears for connecting another element of the differential to the other pinion, the third element of the differential being connected to the motor of the vehicle, a pair of driven gears meshing, respectively, with the drive pinions, a pair of axle shafts secured to the driven gears and operatively connected, respectively, to opposite wheels of the vehicle, and a one-way clutch interposed between two of the elements of the differential for restricting the ratio of rotation of the two wheels to a predetermined range.

5. An axle drive for an automotive vehicle comprising a pair of drive pinions mounted for rotation on parallel axes, a differential mounted coaxial with one of said pinions, said differential comprising a pair of side gears which have different numbers of teeth, planetary pinions meshing therewith, and a carrier for said planetary pinions, one of said side gears being connected to said coaxial drive pinion, means for operatively connecting another element of the differential to the other drive pinion at a speed ratio of other than one to one, so that said side gears keep turning relative to each other when the two driven road wheels of the vehicle turn equally, means for locking said differential when said side gears tend to reverse their relative motion, and means for operatively connecting the third element of the differential with the motor of the vehicle.

6. An axle drive for an automotive vehicle comprising a pair of drive pinions mounted for rotation on parallel axes, a differential mounted coaxial with one of said pinions, said differential comprising a pair of side gears which have different numbers of teeth, a planet carrier and planet pinions rotatably mounted thereon which mesh with said side gears, one element of the differential being connected to said coaxial pinion, a pair of cylindrical gears whose ratio of tooth numbers is equal to the ratio of the tooth numbers of the side gears for connecting another element of the differential to the other drive pinion, means for connecting the third element of the differential to the motor of the vehicle, and a one-way clutch for connecting two of said elements to prevent reversal of their relative rotation.

7. An axle drive for an automotive vehicle comprising a pair of drive pinions mounted for rotation on parallel axes, a differential mounted coaxial with one of said pinions, one element of said differential being operatively connected to said coaxial drive pinion, one element of the differential being operatively connected to the motor of the vehicle, and the third element of the differential being operatively connected to the other drive pinion, a pair of driven gears meshing, respectively, with the drive pinions, a pair of axle shafts secured to the driven gears and operatively connected, respectively, to opposite wheels of the vehicle, a one-way clutch interposed between two of the elements of the differential for restricting the ratio of rotation of the two wheels in forward direction to a predetermined range, and means for preventing operation of said clutch during reverse drive.

8. An axle drive for an automotive vehicle comprising a pair of drive pinions mounted for rotation on parallel axes, a differential mounted coaxial with one of said pinions, one element of said differential being operatively connected to said coaxial drive pinion, another element of the differential being operatively connected to the other drive pinion, and the third element of the differential being operatively connected to the motor of the vehicle, a pair of driven gears meshing, respectively, with the drive pinions, a pair of axle shafts secured to the driven gears and operatively connected, respectively, to two opposite wheels of the vehicle, a pair of one-way clutches operatively connected with said elements for restricting the ratio of rotation of the two wheels in forward direction to a predetermined range, and means for preventing operation of both clutches during reverse drive.

9. An axle drive for an automotive vehicle comprising a pair of drive pinions mounted for rotation on parallel axes, a differential mounted coaxial with one of said pinions, said differential comprising two sun gears which have different tooth numbers, a planet carrier, and planetary pinions rotatably mounted thereon to mesh with said sun gears, one element of the differential being operatively connected to the coaxial drive pinion, another element being operatively connected to the motor of the vehicle, a pair of gears, whose tooth ratio equals the ratio of the tooth numbers of the sun gears, for connecting the third element of the differential with the other drive pinion, a pair of driven gears meshing, respectively, with the drive pinions, a pair of axle shafts secured to the driven gears and operatively connected, respectively, to opposite wheels of the vehicle, and means for locking the differential against operation when the smaller sun gear tends to turn slower than the larger sun gear.

10. An axle drive for an automotive vehicle comprising a differential operatively connected to two opposite wheels of the vehicle and operatively connected to the motor of the vehicle, means for restricting differential action automatically during forward motion of the vehicle when either wheel tends to spin comprising a pair of axially engaging over-running clutches adapted to engage on movement in opposite directions, said clutches being mounted so as automatically to interfere with one another and prevent axial engagement of either clutch during reversal of the vehicle.

11. An axle drive for an automotive vehicle comprising a differential operatively connected to two opposite wheels of the vehicle and operatively connected to the motor of the vehicle, and means for locking the differential against operation comprising a saw-tooth clutch member secured to one element of the differential, a flanged member having a cooperating saw-tooth clutch member secured thereto and directly contacting with the first-named clutch member, and a plurality of friction disks disposed between the flange of said member and said one element of the differential, alternate disks being secured alternately to said flanged member and said one element.

12. An axle drive for an automotive vehicle comprising a pair of drive pinions mounted for rotation on parallel axes, a differential mounted coaxially of one of said pinions and operatively connected thereto, a pair of driven gears meshing, respectively, with the drive pinions, an axle shaft secured to each driven gear and operatively connected with one of two opposite wheels of the vehicle, and a plurality of operative connections between said differential and the other drive pinion, one of said last-named connections being operative at all times, and the other of said last-named connections comprising a normally inoperative over-running clutch which is arranged to operate only when the ratio of rotation of the wheels exceeds a predetermined ratio.

13. An axle drive comprising a pair of drive pinions mounted for rotation on parallel axes, a pair of driven gears meshing, respectively, with said drive pinions and operatively connected to two opposite wheels of the vehicle, a differential mounted coaxial with one drive pinion and comprising three coaxial elements, one of said elements being operatively connected to the motor of the vehicle, another of said elements being connected to the coaxial drive pinion, a pair of cylindrical gears for connecting the third element with the other drive pinion, a pair of cylindrical gears mounted coaxial, respectively, with the two drive pinions and having a tooth ratio different from the tooth ratio of the first-named pair of cylindrical gears, one of said last-named pair of cylindrical gears being rigidly connected with its associated drive pinion and the other being mounted for rotation relative to its associated pinion, an over-running clutch for preventing rotation in one direction of said last-named gear, and means for automatically rendering said clutch inoperative during reverse drive of the vehicle.

14. An axle drive for an automotive vehicle comprising a support, a pair of drive pinions journaled in said support side-by-side for rotation on parallel axes which are fixed relative to the support and relative to one another, a driven gear meshing with each of said pinions with its axis angularly disposed to the axis of the pinion, two normally axially-aligned axle shafts secured, respectively, to said driven gears and operatively connected respectively, to two opposite wheels of the vehicle, and two cylindrical gears journaled in said support coaxially, respectively, with the two pinions for driving the two pinions simultaneously in opposite direction, one of said two cylindrical gears being rigidly connected with its coaxial pinion, said driven gears facing one another, and said drive pinions being disposed between said driven gears at the same side of the axis of said axle shafts.

15. An axle drive for an automotive vehicle comprising a support, a pair of drive pinions journaled in said support side-by-side for rotation on parallel axes which are fixed relative to the support and relative to one another, a driven gear meshing with each of said pinions with its axis angularly disposed to the axis of the pinion, two cylindrical gears journaled in said support coaxially, respectively, with said two pinions for driving the two pinions simultaneously in opposite directions, one of said two cylindrical gears being rigidly connected with it coaxial pinion and the other being mounted to be rotatable relative to its coaxial pinion, an axle shaft secured to each driven gear, each shaft being operatively connected to one of two opposite wheels of the vehicle, and means for mounting each axle shaft in said support for pivotal movement about the axis of its drive pinion.

16. An axle drive for an automotive vehicle comprising a support, a pair of drive pinions journaled in said support side-by-side for rotation on parallel axes which are fixed relative to the support and relative to one another, a driven gear meshing with each of said pinions with its axis angularly disposed to the axis of the pinion, two cylindrical gears journaled in said support coaxially, respectively, with said two pinions for driving the two pinions simultaneously in opposite directions, one of said two cylindrical gears being rigidly connected with its coaxial pinion and the other being mounted to be rotatable relative to its coaxial pinion, an axle shaft secured to each driven gear, and a stub axle operatively connected with each axle shaft for movement both about the axis of the corresponding drive pinion and about an axis parallel thereto, each stub axis carrying one of the wheels of the vehicle.

ERNEST WILDHABER.

REFERENCES CITED

The following references are of record in the file of this patent:

UNITED STATES PATENTS

| Number | Name | Date |
| --- | --- | --- |
| 1,631,996 | Wirrer | June 14, 1927 |
| 1,632,038 | Norris | June 14, 1927 |
| 1,776,677 | Brewer | Sept. 23, 1930 |
| 1,777,024 | Wildhaber | Sept. 30, 1930 |
| 1,797,578 | Hoffman | Mar. 24, 1931 |
| 1,920,175 | Hollos | Aug. 1, 1933 |
| 2,090,893 | Ledwinka | Aug. 24, 1937 |
| 2,196,556 | Hollos | Apr. 9, 1940 |